United States Patent [19]

Wilhelmi

[11] Patent Number: 4,970,990
[45] Date of Patent: Nov. 20, 1990

[54] DEVICE FOR REMOVING MATS FROM THE HAIR OF ANIMALS

[76] Inventor: Frank A. Wilhelmi, 2333 Heywood St., Simi valley, Calif. 93065

[21] Appl. No.: 401,837
[22] Filed: Sep. 1, 1989
[51] Int. Cl.⁵ ............................................. A01K 13/00
[52] U.S. Cl. ........................................ 119/86; 119/94
[58] Field of Search ................. 199/85, 86, 83, 90, 199/94, 156; 132/148, 160; 30/30, 31, 123, 195

[56] References Cited
U.S. PATENT DOCUMENTS

| | | | |
|---|---|---|---|
| 294,305 | 2/1884 | Brill | 119/90 |
| 2,961,996 | 11/1960 | Oliver | 119/86 |
| 3,981,275 | 9/1976 | Schimoles | 119/83 |
| 4,617,875 | 10/1986 | Holland | 119/85 |

FOREIGN PATENT DOCUMENTS
1289433 2/1987 U.S.S.R. ............................. 119/83

Primary Examiner—Robert P. Swiatek
Assistant Examiner—Todd E. Manahan
Attorney, Agent, or Firm—Hadd S. Lane

[57] ABSTRACT

This invention provides a tool for effective removal of mats of hair in the coats of fur-bearing animals. The tool is particularly effective in removing mats from long-haired dogs, while preserving most of the original hair in the original length. The tool consists of a handle and a set of blades suitable for cutting and combind the mats. The blades cut the mat into narrow strips in a single operation, while tines attached to the blades rake or comb the uncut hair in the strips and remove the cut hair. The blades present a smooth, non-cutting surface to the animal's skin, and provide for easy removal of the accumulated hair from the tool. The animal's comfort and the required grooming time are improved, as compared to prior grooming practice.

18 Claims, 5 Drawing Sheets

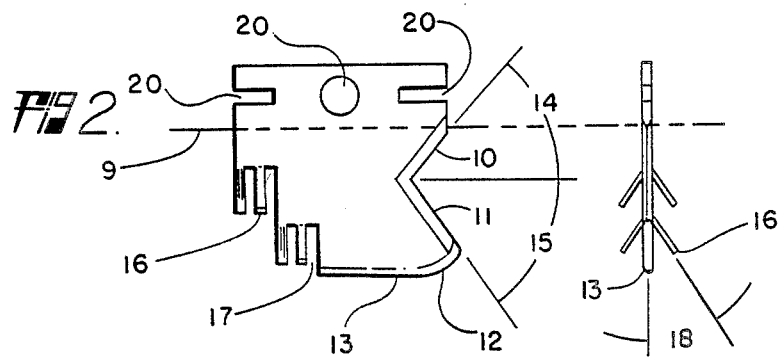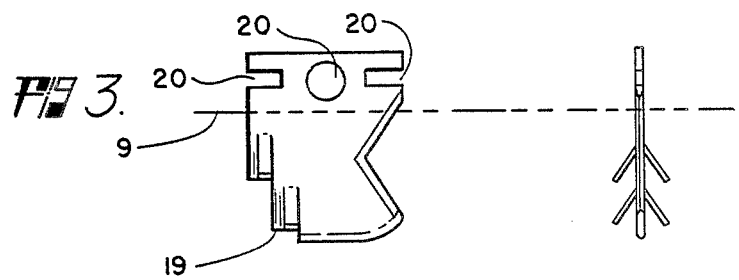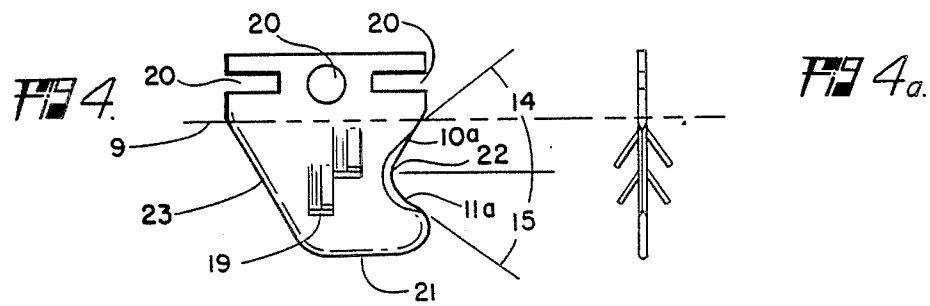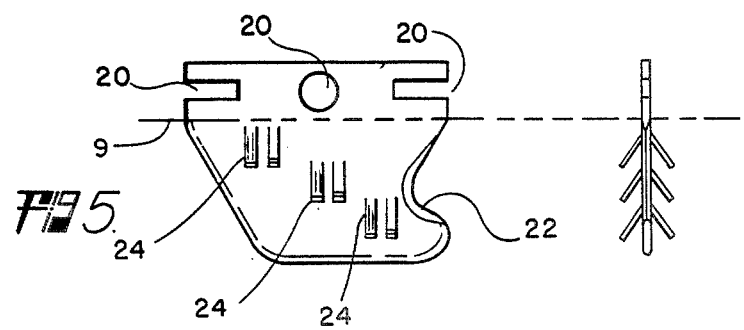

DEVICE FOR REMOVING MATS FROM THE HAIR OF ANIMALS

BACKGROUND OF THE INVENTION

Long-haired dogs and other hair-bearing animals tend to form mats in their hair if not regularly groomed. Matting usually increases toward the end of the cold season when their coats are the heaviest. The winter "wool" collects dirt, dander and oil from the animal's skin, and tangles with the longer hairs to produce the mat. Heretofore, this mat was difficult to remove, and involved cutting off the longer hair at the base, subjecting the animal to an uncomfortable ordeal of brushing with the familiar wire-bristled brush.

The patent to G. R. Oliver, U.S. Pat. No. 2961,966, addresses this problem and describes a tool for mat removal. This tool consists of a single knife with a replaceable blade to cut the mat and gradually effect its removal. Also Design D-206,527 shows a grooming comb.

BRIEF DESCRIPTION OF THE INVENTION

FIGS. 2 and 2a are, respectively, a side elevation and a front elevation of a blade showing a V-shaped cutting edge and tines protruding at an angle to the side of the blade. The blade has an open tine structure, with two sets of tines in two rows.

FIGS. 3 and 3a are, respectively, a side elevation and a front elevation of a blade featuring an open structure similar to FIGS. 2 and 2a, but with adjacent tines such as might be stamped from flat strip stock. Also shown is an aperture for anchoring the blade in a molded handle.

FIGS. 4 and 4a are, respectively, a side elevation and a front elevation of a blade showing a curved cutting edge, with an enclosed tine structure. This enclosed structure permits operation of the blade in both forward and backward directions without risk of scratching the animal's skin with the tines.

FIGS. 5 and 5a are, respectively, a side and front elevation of a blade featuring greater length and multiple sets of tines, also in an enclosed tine structure.

DETAILED DESCRIPTION

Figure 1:
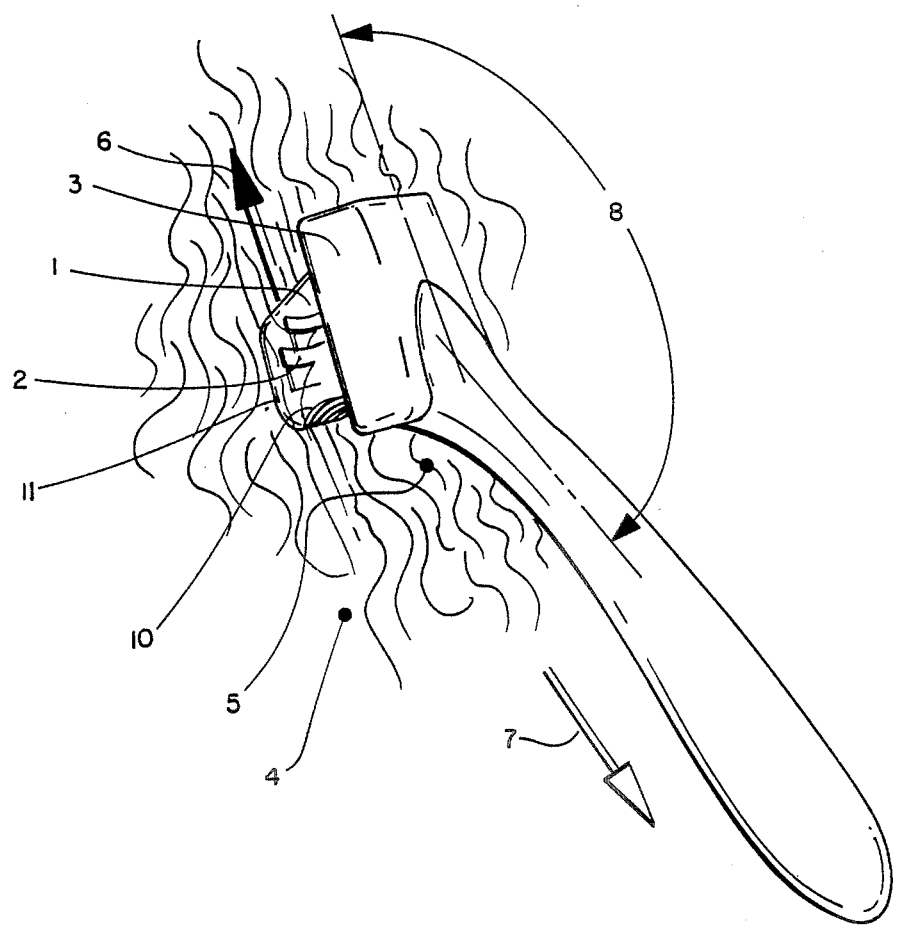
FIG. 1 is a drawing of a small brush for use in concave areas such as behind the ears, or on the high inside forelegs.

In FIG. 1, a multiple array of blades 1, with two sets of opposing tines 2, arranged in two rows, is embedded and anchored in a brush body 3. This embodiment of the invention is suitable for removing mats when the blades are placed in contact with the animal's skin 4 and drawn through the hair 5 parallel to the natural lie of the coat as shown by arrow 7. The relative movement of the hair through the blade is shown by arrow 6. The hair is first lifted away from the skin by the lower cutting edge, the mat is divided into strips by the multiple blades and then these mat strips are drawn between the blades whereby the tines remove the tangled, cut hair. The brush head is aligned with angle 8 to the handle to provide clearance for the operator's fingers between the handle and the animal's body. This clearance allows the blade to reach its maximum cutting depth.

It should be noted that if the brush is pulled through the coat at a transverse angle to the natural lie, some of the longer hair is cut, as well as the matted wool, resulting in a thinning effect. Some skill is required on the part of the operator, but a varied amount of either shortening or thinning can be achieved by controlling the angle of attack of the brush. Similarly, the depth of the cut, and hence the drag on the coat, can be controlled by the angle between the handle and the animal's skin. Raising the handle away from the skin lifts the cutting edge, providing a more shallow cut with reduced pulling of the skin. A deep or thick mat can be removed comfortably by successively deepening each cut as the handle angle is reduced.

FIGS. 2 and 2a show the important features of the blade 1 design. The blade is embedded in the brush body to depth noted by dashed line 9. Stamped openings 20 are suitable for anchoring the blade in a molded plastic brush body. This particular arrangement provides a means for securing the blades in the brush body with a cylindrical pin, allowing replacement when they become dull. A doubl-angled cutting edge 10, 11 is provided to achieve an enhanced effect in which the hair is cut while sliding along the cutting edge toward the apex of the angle formed by the two edges. An earlier prototype used a single cutting edge, but was found to produce high drag on the coat. The hair became wedged against the brush body, causing friction and hair breakage. By providing sharpened edge 10, the hair is pushed away from the brush body, and is cut rather than pulled out of the coat. Edge 11 is longer than edge 10, lifting the hair away from the skin and providing most of the cutting surface. The lower edge 13 of the blade 1 is smooth and rounded to slide comfortably over the animal's skin 4. The front 12 of the blade 1 is curved upward like the front of a ski. The skin tends to pile up in front of the blade and this curvature prevents the skin from being cut. Curve 12 rises to meet edge 11 such that its tangent exceeds 90 degrees, or slightly more than vertical, so that the point of the blade is dull. Blade angles 14, 15 were both 60 degrees in the prototype, but may vary with blade size.

The tines 16 project from the blade 1 and are given sufficient clearance from the lower edge of the blade so as not to scratch the animal's skin. Two rows of tines are provided to achieve greater raking of the mat than a single set would provide, a set herein being defined as a pair of tines with their roots at the same level on the blade, protruding from opposing sides of the blade. For the prototype, the tines were made as shown by cutting slots with an abrasive wheel of thickness 0.020 inches, thus providing a gap 17 between the tines. For volume manufacturing by die-stamping strip stock, the tines could be adjacent or non-adjacent as determined practical.

Also for the prototype, the lower tine set was toward the front and the higher set toward the rear to allow the front of the blade to be lifted without risk of the rear tines contacting the skin. This is recommended for the open configuration shown here. For the closed configuration of FIG. 4, the order can be reversed. As seen in the front elevation, the tines 16 are set at angle 18 from the vertical. In the prototype this angle 18 was approximately 35 degrees. This provided effective raking of the cut hair from the strips while allowing easy removal of hair from the brush. The choice of this angle requires a trade off between these two functions.

In FIG. 3, the tine sets 19 are shown adjacent as would be practical for stamping with an opposed die set.

In FIG. 4, the embodiment of the invention is shown with an enclosed tine structure, wherein the blade's lower surface 21 encloses the tine sets 19. This eliminates the possibility of the tines coming in contact with the animal's skin. This feature permits reversal of the tine set order, such that the upper tines can be forward and the lower tines to the rear. This arrangement improves the flow of hair strips through the blade set; the hair, having been lifted by cutting edge 11, is directed downward again, pulling the hair across cutting edge 11 at a more advantageous angle.

A second key feature of this embodiment is the use of a continuously curved cutting edge which has a tangential relationship to edges 11a, 10a. The curved apex 22 has the advantage over the apex shown in FIGS. 2 and 3 that the hair is more evenly distributed over the edge, resulting in lower cutting resistance and improved wear, i.e. the edge stays sharper longer.

A third key feature of this embodiment is the addition of a second non-cutting edge 23 at the rear of the blade. This permits and facilitates the use of the brush in the reverse direction for combing of the coat without further cutting of the hair. Once the mat has been sufficiently subdivided, the brush can be reversed to comb out the body of the mat. The upward slope of edge 23 lifts the brush over large remaining mats to prevent snags and pulling. This mode of operation is also very effective for removing the loose winter wool from the coat in areas which are not matted.

FIG. 5 illustrates the use of more than two rows of non-adjacent tine sets, which can be either adjacent or non-adjacent, enclosed or unenclosed, and combined with features previously put forward. Additional tine sets increases the quantity of hair removed with each pass, but also increases the drag on the skin. The invention also encompasses the use of randomly placed tines, not necessarily arranged in sets or rows. The terms "sets" and "rows" are used herein as explanatory constructs only. Also shown is an alternate cutting edge configuration wherein only the apex portion 22 the leading edge is ground for sharpening. This may be preferred for reasons of safety in a commercial product.

Figure 6:
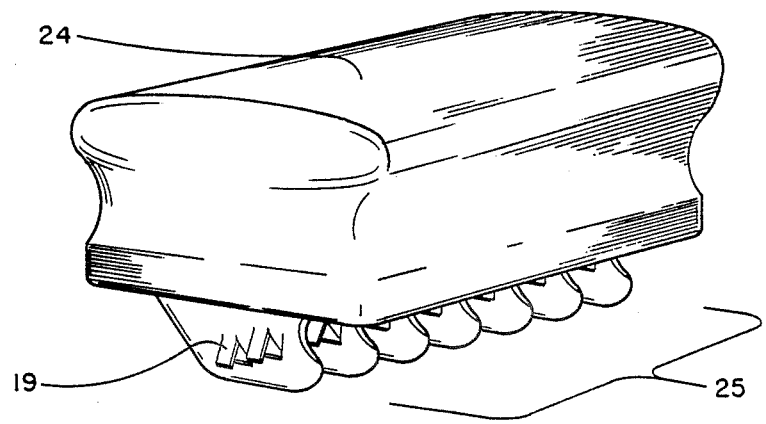
FIG. 6 is an isometric projection of a larger brush suitable for operation in both forward (cutting & combing) and reverse (combing only) directions.

In FIG. 6, an embodiment of the invention is a handheld brush 24 with multiple blades suitable for grooming large areas of an animal, with which the blades can be directed in either the forward (cutting) or reverse (combing) directions. A key feature of this and any other implementation is arrangement of the blades in a linear, parallel, and equidistant array 25. Any other arrangement relinquishes the capacity to increase or decrease the depth of cut by respectively tilting the brush body forward or backward. The prototype for this embodiment comprised six blades on ¼ inch centers.

Figure 7:
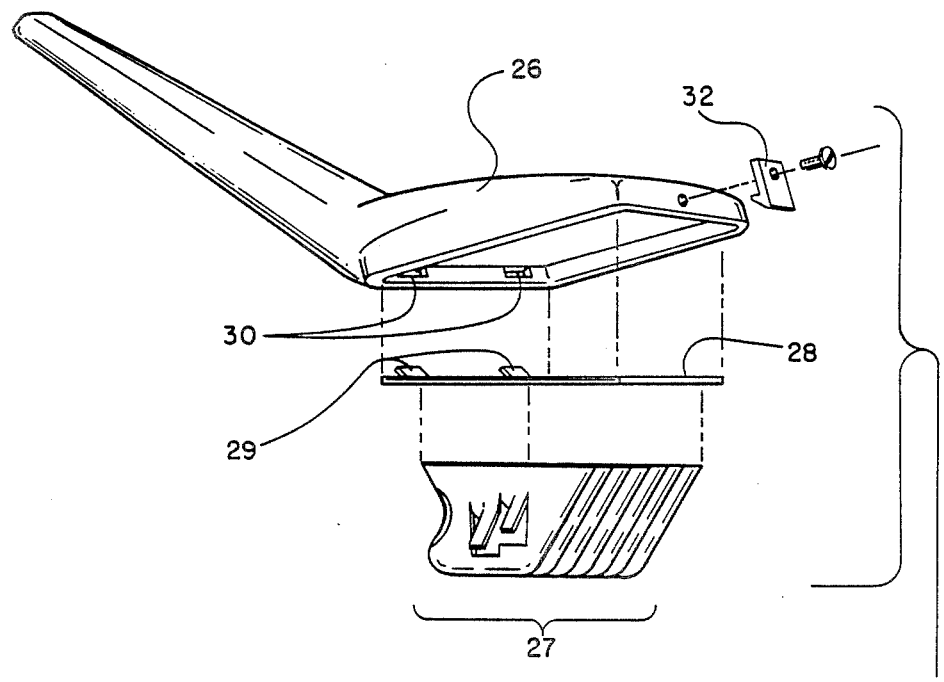
FIG. 7 is an exploded view of a small detail brush, according to this invention, with a replaceable blade set.

FIG. 7 illustrates another adaptation of the invention, comprising a brush body and handle 26 with provision for retaining and releasing a replaceable blade set. Said blade set consisting of several blades 27 of the kind described above with the portion above dotted line 9 of FIG. 2 deleted, and affixed to a mounting plate 28 by suitable means such as weldment. Said plate to have means of insertion 29, 30 and retention into the brush. A simple spring catch 32 provides a means for locking the blade in place and releasing same for replacement. The optimum number of blades, their spacing, depth, cutting edge angles or radii, number of rows or sets of tines per blade, and brush size or configuration will vary with the application.

Figure 8:
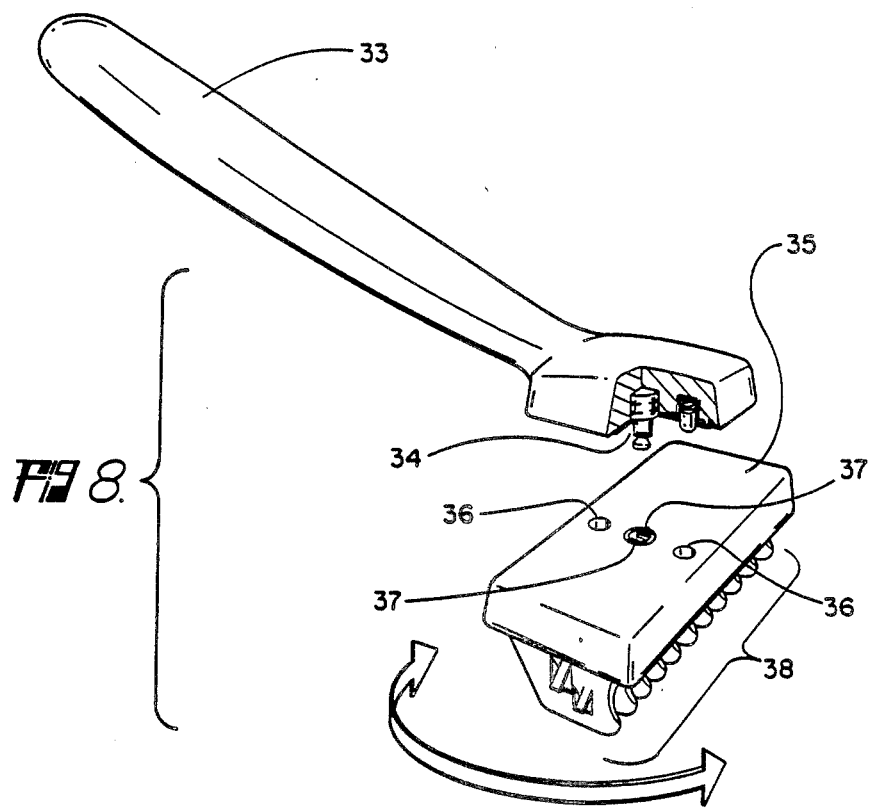
FIG. 8 is an isometric projection, with an exploded view of a handle equipped with a spindle and detents, suitable for accepting replaceable blade sets which can be rotated and locked in position for operation in both forward and reverse directions.

FIG. 8 illustrates an embodiment of the invention featuring a handle 33 with a spindle 34 for attaching replaceable blade sets which can be rotated in use to reverse the direction of operation of the blades, while maintaining the action of drawing or pulling the brush through the coat. The blade set comprises a fabricated head assembly 35 with springs fingers 37 for engaging the spindle to retain and permit rotation of the blade set, and with detent pockets 36 for locking the blade set with relation to the handle, and with an array of blades 38 affixed to the head assembly. Blade sets of different widths and number of blades can be provided for various applications. The smooth sides of the head assembly facilitates a comfortable grip while removing or rotating the blade set.

Figure 9:
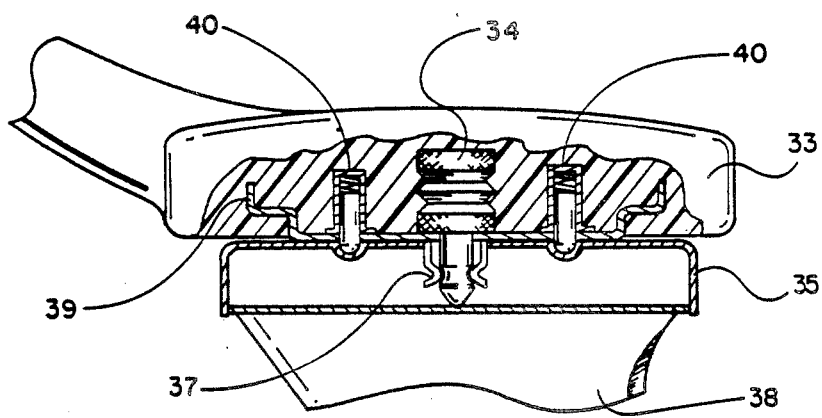
FIG. 9 is a side elevation of the assembled brush shown in FIG. 8, with a cutaway showing details of the handle and blade set hardware.

FIG. 9 shows a cutaway detail of the brush in FIG. 8, with the head engaging the spindle, revealing the detail of the spindle assembly, comprising a bearing plate 39 suitable for anchoring in the handle by bonding or molding in place. Spring pressed detents 40 releasably engage pockets 36 to hold the blade set 35 in either forward or reverse position, with respect to the handle, as selected.

Figure 10:
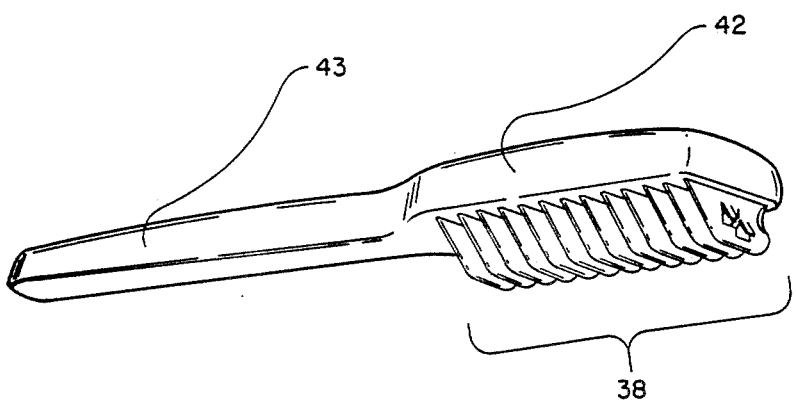
FIG. 10 is an isometric projection of an expected commercial embodiment of the invention, featuring a handle and body similar to a hair brush, which is suitable for operation in both forward and reverse directions.

FIG. 10 shows an embodiment of the invention wherein the brush body 42 and handle 43 are shaped in the familiar form of a hair brush, with the blade array 38 permanently embedded. This form accomplishes the purpose of reversable operation, with good blade angle control and stability. It is noted that means can be provided to permit insertion, retention, and replacement of individual blades in those embodiments of the invention not featuring replaceable blade sets. Various methods of pinning, clamping, or locking the blades in place are known, and are in the public domain.

In use, the groomer passes the tool through the hair in the direction of the lay. Each blade cuts the hair of the mat into a series of parallel strips. It may require more than one pass to cut the mat completely. Since the cuts are in the direction of the lay, most of the long hairs in the strip will not be cut. The rest of the hairs will be cut into shorter lengths. As the tines pass the edges of the strips, as the tool moves (as in FIG. 1), the the tines 2 (or 16, 17, 19, 24, etc. of the other FIGS.) will contact the shorter hairs and comb them out. This is readily done because the strip, being relatively narrow, holds the shorter hairs more lossely than in the mat. The tines also comb the long hairs without undue tension so they are not pulled out at the roots or broken. The attached short hair is also combed. The results is that the outer parts of the hair causing the mat are removed, most of the long hair is retained and combed, and the shorter hair is also retained and combed. This leaves the mat area as a combed, unmatted spot of slightly thinner hair, the spot being usually unnoticeable. Neither the tines nor the cutting edge contact the animal's skin.

The invention consists of a handle or body, which is gripped by the groomer's hand, and a set of blades suitable for cutting and/or combing through the mats which are embedded in, or attached to, the handle.

The design of the tines accomplishes rapid removal of the matted hair, and provides for easy removal of the accumulated hair from the tool because the tines lie in planes perpendicular to the brush head, while forming an acute angle to the blade, with the roots of the tines toward the brush body. When the brush is turned over, the accumulated hair will be found extending behind the trailing edge of the brush and can easily be grasped in a wad and lifted out of the blades.

The blade design presents a smooth, non-cutting edge to the animal's skin, while the cutting edge and tine designs function to remove the matted hair while minimizing hair pull. Both the animal's comfort and the required grooming time are improved substantially when compared to standard grooming practice.

I claim:

1. A tool for removing a mat from the hair of an animal, comprising a body with an attached array of parallel blades, each blade equipped with a cutting edge for cutting the mat into strips, and with tines extending transversely from the blades to comb the matted hair in and to remove the cut hair from, the said strips as the array of blades is moved through the hair in the direction of the cutting edges.

2. The tool of claim 1 wherein each blade has a leading portion and the said cutting edge is on said leading portion, and comprises two converging cutting segments, said blades being attached to said body along a second portion adjacent said leading portion, whereby the hair is restrained from wedging against said body and the hair is lifted from the animal's skin and cut into said strips.

3. The tool of claim 2 wherein the tines extend from at least one side of each blade, said tines being rooted nearest the said body and directed away from said body at an acute angle from the blade.

4. The tool of claim 3 wherein each blade is attached to the body along a line (9), and the said tines extend from their respective blades at an approximate right angle to said line when viewed laterally from said at least one side.

5. The tool of claim 2 in which the tines are in at least one row and in at least one column.

6. The tool of claim 2 wherein the said converging segments meet in a curved apex, to provide more effective cutting and longer blade life.

7. The tool of claim 6 wherein only the apex of the converging cutting segments is sharpened, to inhibit accidental cutting of the animal's skin or the groomer's person.

8. The tool of claim 2 wherein each blade has a base portion most distant from said body which is against the animal's skin when said tool is in cutting position said base portion being smooth for the animal's comfort, and having a rounded forward segment adjacent the leading portion of said blade to form a dull point, to avoid cutting the animal's skin as the array is moved through said hair.

9. The tool of claim 2, wherein each blade has a base portion most distant from said body, which contacts the animal's skin, said base portion when moving in the cutting direction, and to form a non-cutting comb when moved in the opposite direction.

10. The tool of claim 1 wherein the parallel blades of the array are equally spaced and in a linear pattern, thus permitting the depth of the cut to be determined by the angle of the said body to the animal's skin.

11. The tool of claim 1 wherein the said array is secured to a mounting plate which is removable attached to said body.

12. The tool of claim 1 wherein each blade has a leading portion and said cutting edge is on said leading portion, followed by a portion most remote from said body and which contacts the animal's skin, and then curves upwardly and backwardly to form a non-cutting comb, wherein said array is secured to a mounting plate which is removably attached to said body to facilitate forward cutting and combing, and rearward combing alone.

13. The tool of claim 12 wherein the said plate is attached to said body by means of a spindle whereby said plate may be rotated between positions of combing only, or cutting and combing, and means to latch said plate in either position, to further facilitate said forward cutting and rearward combing.

14. A method of removing a mat from the hair of an animal comprising the steps of cutting said mat into a series of strips by parallel cuts, and passing tines through the sides of said strips to remove hair cuttings produced by said cutting and also comb the remaining hair.

15. The method of claim 14 wherein the cutting is made in the direction of the lay of the hair.

16. The method of claim 15 wherein the cutting is made in a plurality of successive steps.

17. The method of claim 15 wherein the steps of cutting and of passing the tines are done simultaneously.

18. The method of claim 17, including the further step of combing said mat, without cutting, after the cutting.

* * * * *